(12) United States Patent
Myhre et al.

(10) Patent No.: US 7,397,353 B2
(45) Date of Patent: Jul. 8, 2008

(54) WIRELESS TIRE PRESSURE AND/OR WHEEL SPEED SENSING SYSTEM FOR AIRCRAFT

(75) Inventors: Douglas C. Myhre, Eden Prairie, MN (US); Mark J. Buenz, Prior Lake, MN (US); John A. Norlien, Pine Springs, MN (US); William G. Kunik, Lakeville, MN (US); Wade W. Williams, St. Paul, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 464 days.

(21) Appl. No.: 11/190,404

(22) Filed: Jul. 27, 2005

(65) Prior Publication Data

US 2005/0264406 A1 Dec. 1, 2005

Related U.S. Application Data

(62) Division of application No. 10/647,487, filed on Aug. 25, 2003, now Pat. No. 7,202,778.

(51) Int. Cl.
*B60C 23/00* (2006.01)
(52) U.S. Cl. ............... 340/448; 73/146.5; 340/444; 340/447
(58) Field of Classification Search ......... 340/442–448, 340/945; 73/146–146.5
See application file for complete search history.

(56) References Cited

U.S. PATENT DOCUMENTS 2,274,557 A 2/1942 Morgan et al.

(Continued)

FOREIGN PATENT DOCUMENTS

CA 2272019 11/1999

(Continued)

OTHER PUBLICATIONS

International Search Report for PCT application No. PCT/US2004/027443 mailed Jan. 12, 2006.

(Continued)

*Primary Examiner*—Brent Swarthout
(74) *Attorney, Agent, or Firm*—Kevin O'Brien; Calfee, Halter & Griswold LLP

(57) ABSTRACT

A wireless tire pressure sensing system for an aircraft comprises: dual resonant circuits mounted to a wheel of the aircraft, each resonant circuit comprising: a variable capacitance sensor and a wire loop of a predetermined inductance coupled thereto, one capacitance sensor for monitoring the pressure of a tire mounted to the wheel, and the other capacitance sensor operative as a reference to the one capacitance sensor; an interrogating circuit magnetically coupleable to the dual resonant circuits and operative to induce magnetically a variable frequency current in the dual resonant circuits, the one resonant circuit responding to the induced current with an E-field signal at a first resonant frequency commensurate with the capacitance of the one sensor, and the other resonant circuit responding to the induced current with an E-field signal at a second resonant frequency commensurate with the capacitance of the other sensor; a receiving circuit E-field coupleable to the dual resonant circuits and operative to receive the E-field signals at the first and second resonant frequencies and to generate first and second signals representative thereof, and a processing circuit coupled to the receiving circuit for processing the first and second signals to generate a compensated pressure reading of the tire. The pressure sensing system may be modified to provide and/or include wheel speed sensing.

22 Claims, 13 Drawing Sheets

U.S. PATENT DOCUMENTS

| | | | |
|---|---|---|---|
| 3,662,335 A | 5/1972 | Fritze | |
| 3,723,966 A | 3/1973 | Mueller et al. | |
| 3,911,434 A | 10/1975 | Cook | |
| 3,938,077 A | 2/1976 | Nakanishi et al. | |
| 4,006,449 A | 2/1977 | Sumi | |
| 4,072,926 A | 2/1978 | Shimahara et al. | |
| 4,074,227 A | 2/1978 | Kalmus | |
| 4,389,884 A | 6/1983 | Agulia | |
| 4,409,586 A | 10/1983 | Hochstein | |
| 4,588,978 A | 5/1986 | Allen | |
| 4,717,905 A | 1/1988 | Morrison | |
| 4,953,393 A | 9/1990 | Galasko et al. | |
| 5,227,798 A | 7/1993 | Hildebrand | |
| 5,260,683 A | 11/1993 | Tanaka et al. | |
| 5,274,355 A | 12/1993 | Galan | |
| 5,542,118 A | 7/1996 | Warnagiris | |
| 5,703,576 A | 12/1997 | Spillman, Jr. et al. | |
| 6,053,038 A | 4/2000 | Schramm et al. | |
| 6,215,393 B1 | 4/2001 | Delaporte | |
| 6,362,732 B1 | 3/2002 | Konchin et al. | |
| 6,378,360 B1 | 4/2002 | Bartels | |
| 6,553,820 B1 | 4/2003 | Tsagas | |
| 6,609,419 B1 | 8/2003 | Bankart | |
| 7,202,778 B2 * | 4/2007 | Buenz et al. | 340/448 |
| 2001/0008083 A1 | 7/2001 | Brown | |
| 2002/0092347 A1 * | 7/2002 | Niekerk et al. | 73/146.2 |
| 2002/0095980 A1 | 7/2002 | Breed et al. | |
| 2003/0006890 A1 | 1/2003 | Magiawala et al. | |
| 2003/0006893 A1 | 1/2003 | Dunbridge et al. | |
| 2004/0100251 A1 * | 5/2004 | Lohberg | 324/166 |
| 2004/0267493 A1 | 12/2004 | Pinard et al. | |
| 2005/0046558 A1 * | 3/2005 | Buenz et al. | 340/445 |
| 2005/0264406 A1 * | 12/2005 | Myhre et al. | 340/445 |

FOREIGN PATENT DOCUMENTS

| | | |
|---|---|---|
| DE | 199 22 707 A1 | 1/2000 |
| DE | 198 53 135 A1 | 5/2000 |
| GB | 2 065 896 A | 7/1981 |
| JP | 63 306905 A | 12/1988 |
| WO | WO 03/038447 | 5/2003 |

OTHER PUBLICATIONS

Written Opinion for PCT/US2004/027443 mailed Jan. 12, 2006.

* cited by examiner

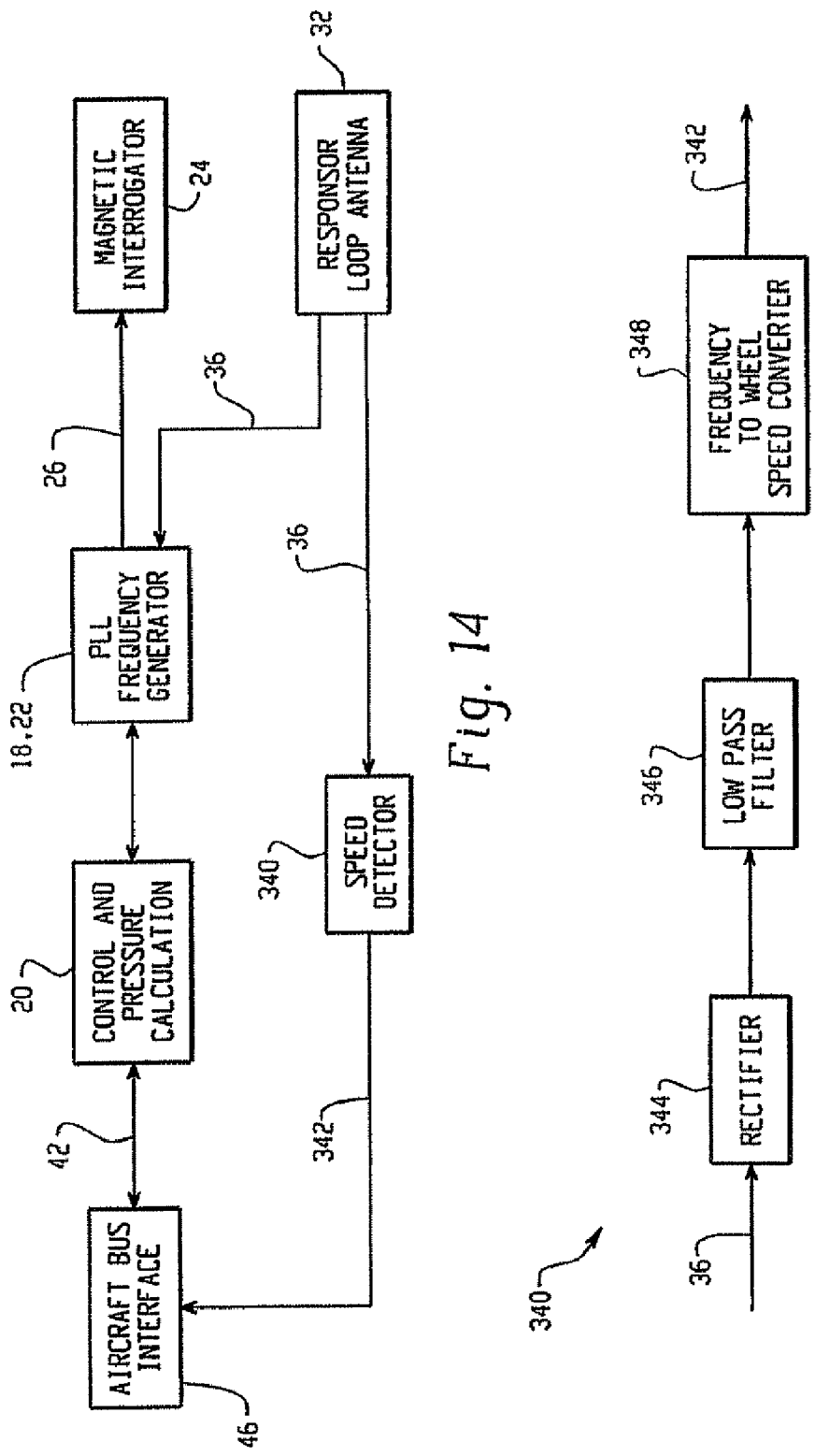

WIRELESS TIRE PRESSURE AND/OR WHEEL SPEED SENSING SYSTEM FOR AIRCRAFT

This application is a divisional of prior U.S. application Ser. No. 10/647,487, filed Aug. 25, 2003 now U.S. Pat. No. 7,202,778, which is hereby incorporated by reference.

BACKGROUND OF THE INVENTION

The present invention is related to aircraft tire pressure and wheel speed sensing, in general, and more particularly to a wireless tire pressure and/or wheel speed sensing system for aircraft.

It is well known that improper inflation will cause excessive wear on tires and lead to premature replacement thereof. Keeping a tire at its manufacture's recommended inflation pressure will extend the life of the tire. This is especially important in the aircraft industry where premature replacement of aircraft tires is particularly expensive. Safety is another consideration. Taking off and landing on improperly inflated tires may lead to aircraft accidents. Accordingly, checking for proper tire pressure is a mandatory part of the preflight inspection of the aircraft.

Generally, during preflight inspection, a conventional pneumatic-mechanical pressure gauge is used manually to check the tire pressure through a valve stem. However, each time the pressure is tested with such a pressure gauge a small amount of air is released from the tire. Thus, over a number of inspections, the tire will become under inflated and will require re-inflation which is a timely and costly maintenance process. To reduce the frequency of tire re-inflation, some commercial aircraft wheels have been equipped with a fixed pneumatic coupling to the valve stem via a spinning coupler. In such a system, the monitored tire pressure is converted to an electrical signal which may be read by a hand held tire pressure reader, for example. As with any moving part, the pneumatic spinning coupler suffers from wear with time which may lead to air pressure leakage. Accordingly, maintenance is required at frequent intervals.

A more recent wheel mounted pressure monitoring system provides for a fixed pneumatic coupling without a spinning coupler. This system converts the monitored pressure into a proportional alternating or pulsed electrical signal which is passed through a pair of transformer coils which are closely coupled. One coil is stationary and the other is rotating. Such a system is considered rather bulky and expensive. In addition, the accuracy of the electrical pressure signal is vulnerable to environmental changes at the wheel which may vary in temperature from −50° C. to approximately 150° C., for example., and be exposed to inclement weather conditions as well.

The present invention provides for an aircraft wheel mounted tire pressure monitoring unit which overcomes the drawbacks of the present systems. In addition, the present invention may include wheel speed sensing with minimal additional wheel mounted components.

SUMMARY OF THE INVENTION

In accordance with one aspect of the present invention, a wireless tire pressure sensing system for an aircraft comprises: dual resonant circuits mounted to a wheel of the aircraft, one resonant circuit comprising: a first variable capacitance sensor for monitoring the pressure of a tire mounted to the wheel; and a first wire loop of a first predetermined inductance coupled to the first variable capacitance sensor, and the other resonant circuit comprising: a second variable capacitance sensor operative as a reference to the first variable capacitance sensor; and a second wire loop of a second predetermined inductance coupled to the second variable capacitance sensor; an interrogating circuit magnetically coupleable to the dual resonant circuits and operative to induce magnetically a variable frequency current in the dual resonant circuits, the one resonant circuit responding to the induced current with an E-field signal at a first resonant frequency commensurate with the capacitance of the first variable capacitance sensor, and the other resonant circuit responding to the induced current with an E-field signal at a second resonant frequency commensurate with the capacitance of the second variable capacitance sensor; a receiving circuit E-field coupleable to the dual resonant circuits and operative to receive the E-field signals at the first and second resonant frequencies and to generate first and second signals representative thereof; and a processing circuit coupled to the receiving circuit for processing the first and second signals to generate a compensated pressure reading of the tire.

In accordance with another aspect of the present invention, a method of wirelessly measuring pressure of a tire of an aircraft comprises the steps of: mounting first and second resonant circuits to a wheel of the aircraft to which the tire is mounted; monitoring tire pressure with the first resonant circuit; using the second resonant circuit as a reference to the first resonant circuit; generating a variable frequency signal; magnetically coupling the variable frequency signal to the first and second resonant circuits; inducing first and second resonant frequencies in the first and second resonant circuits, respectively, by the magnetically coupled variable frequency signal, the first resonant frequency representative of an uncompensated pressure reading and the second resonant frequency signal representative of a compensation reading; E-field coupling the first and second resonant frequencies from the first and second resonant circuits to a receiver circuit; and generating a compensated pressure reading from the E-field coupled first and second resonant frequencies.

In accordance with yet another aspect of the present invention, a wireless tire pressure and wheel speed sensing system for an aircraft comprises: a resonant circuit mounted to a wheel of the aircraft for monitoring the pressure of a tire mounted to the wheel, the resonant circuit comprising a wire loop of a predetermined inductance; an interrogating circuit magnetically coupleable to the resonant circuit and operative to induce magnetically a variable frequency current in the wire loop of the resonant circuit, the resonant circuit generating a corresponding variable frequency electric field in response to the induced current, the variable frequency electric field including a resonant frequency commensurate with the pressure of the tire; a magnetic field altering apparatus for alternating the magnetic coupling between the wire loop and the interrogating circuit to cause a rate of amplitude modulations of the variable frequency electric field commensurate with the wheel speed; a receiving circuit E-field coupleable to the resonant circuit and operative to receive the amplitude modulated variable frequency electric field of the resonant circuit and to generate a signal representative thereof; a first processing circuit coupled to the receiving circuit for processing the signal to generate a pressure reading of the tire based on the resonant frequency thereof; and a second processing circuit coupled to the receiving circuit for processing the signal to generate a wheel speed reading based on the rate of amplitude modulations thereof.

In accordance with a further another aspect of the present invention, a wireless tire pressure sensing system for an aircraft comprises: a resonant circuit mounted to a wheel of the aircraft, the resonant circuit comprising: a variable capacitance sensor for monitoring the pressure of a tire mounted to the wheel; and a wire loop of a predetermined inductance coupled to the variable capacitance sensor; an interrogating circuit magnetically coupleable to the resonant circuit and operative to induce magnetically a variable frequency current in the resonant circuit, the resonant circuit responding to the induced current with an E-field signal at a resonant frequency commensurate with the capacitance of the variable capacitance sensor; a receiving circuit E-field coupleable to the resonant circuit and operative to receive the E-field signal at the resonant frequency and to generate a signal representative thereof; and a processing circuit coupled to the receiving circuit for processing the signal to generate a pressure reading of the tire.

In accordance with a still further aspect of the present invention, a method of wirelessly measuring pressure of a tire of an aircraft comprises the steps of: mounting a resonant circuit to a wheel of the aircraft to which the tire is mounted; monitoring tire pressure with the resonant circuit; generating a variable frequency signal; magnetically coupling the variable frequency signal to the resonant circuit; inducing a resonant frequency in the resonant circuit by the magnetically coupled variable frequency signal, the resonant frequency representative of a pressure reading; E-field coupling the resonant frequency from the resonant circuit to a receiver circuit; and generating a pressure reading from the E-field coupled resonant frequency.

In accordance with a still further aspect of the present invention, a wireless wheel speed sensing system for an aircraft comprises: a wire loop mounted to a wheel of the aircraft and rotating therewith; an interrogating circuit magnetically coupleable to the rotating wire loop and operative to induce magnetically a current signal in the rotating wire loop, the rotating wire loop generating a corresponding electric field in response to the induced current; a magnetic field altering apparatus for alternating the magnetic coupling between the wire loop and the interrogating circuit to cause a rate of amplitude modulations of the electric field commensurate with the wheel speed; and a receiving circuit statically mounted with respect to the rotating wheel, the receiving circuit operative to receive the amplitude modulated electric field and to generate a signal representative of wheel speed.

BRIEF DESCRIPTION OF THE DRAWINGS

FIG. 14 is a block diagram schematic of the exemplary wireless tire pressure and/or wheel speed sensing system suitable for use in an aircraft application.

FIG. 15 is a block diagram schematic of an exemplary speed detector suitable for use in the embodiment of FIG. 14.

DETAILED DESCRIPTION OF THE INVENTION

An embodiment of the wireless tire pressure sensing system in accordance with one aspect of the present invention comprises two parts. One part is made up of dual, aircraft wheel mounted, resonant circuits. One of the dual resonant circuits varies in resonant frequency as tire pressure, temperature and other parameters vary and the other or reference resonant circuit varies in resonant frequency only with temperature and other parameter variations. The second part of the system is an aircraft landing gear mounted or handheld exciter unit that generates a variable frequency magnetic field to excite the wheel mounted pressure and reference resonant circuits and determines the resonant frequencies thereof as will become better understood from the description below.

In the present embodiment, each resonant circuit comprises an inductor, which is formed by a loop of wire of conductive material, like copper, for example, and a variable capacitor sensor configured in a tank circuit. The copper wire loop, which also acts as an antenna for its respective resonant circuit, may be mounted to a layer of temperature stable material, like a PC card, for example, which is supported by a support structure within a hub or hubcap of the wheel. The size of a supporting structure for the dual, inductive wire loops is dependent on the width and diameter of the hubcap of the aircraft on which it is to be mounted. Generally, the smallest tire dimensions correspond to the nose wheel of the aircraft. The construction of the hubcap mounted inductive wire loop assembly will be described in greater detail herein below. Testing of the dual resonant circuits for frequency response, range of activation, effects of capacitance on frequency, and frequency response changes that occur with changes in shape (bending) of the supporting structure revealed that the reference resonant circuit mounted on the same assembly as the tire pressure measuring resonant circuit will eliminate substantially the frequency variations on the pressure measurement that come with mounting variations, environmental factors and temperature changes.

A block diagram schematic illustration of the embodiment of the wireless tire pressure sensing system is shown in FIGS.

Figure 1:
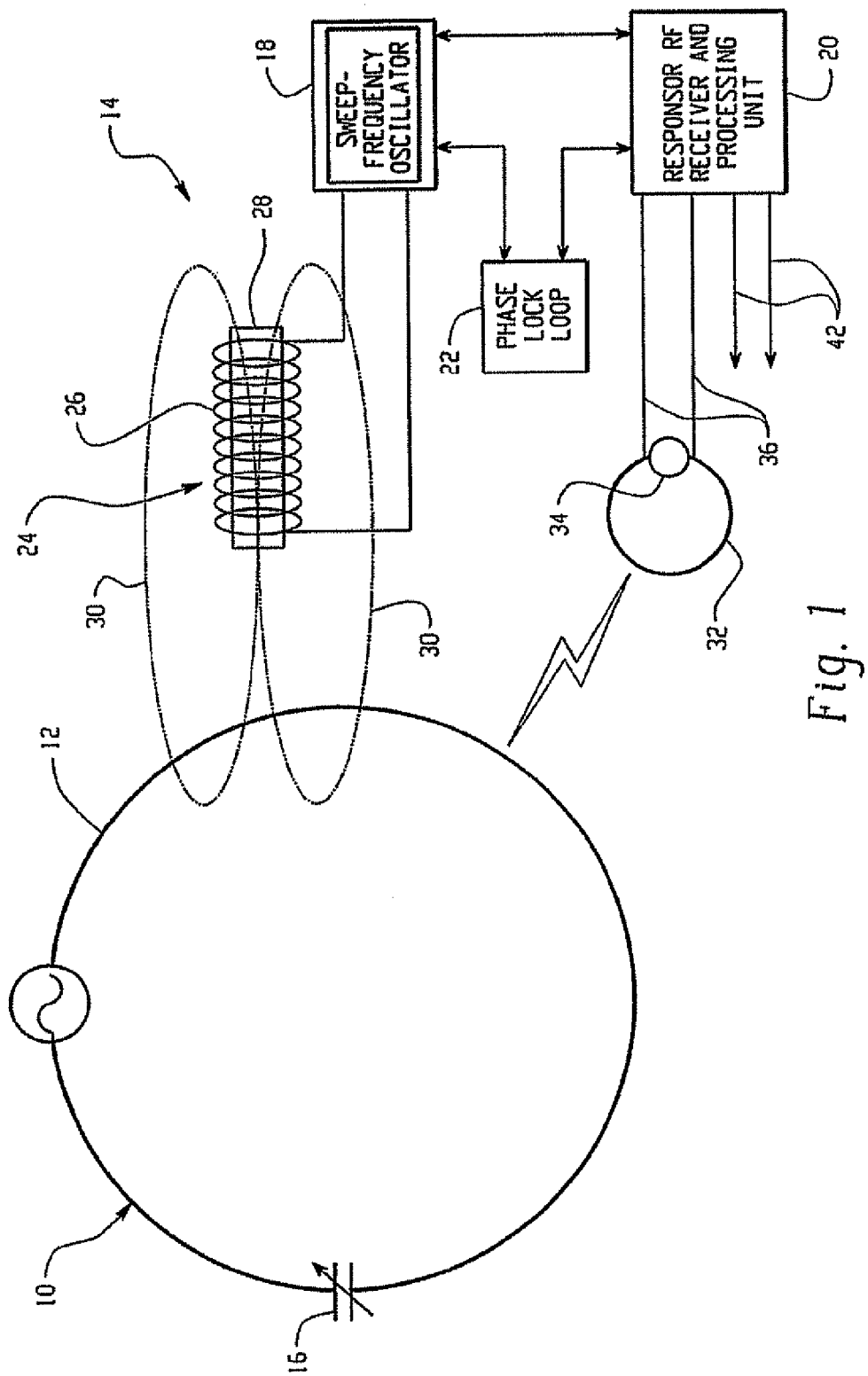
FIG. 1 is a block diagram schematic illustration of an exemplary wireless tire pressure sensing system suitable for embodying one aspect of the present invention.
Figure 2:
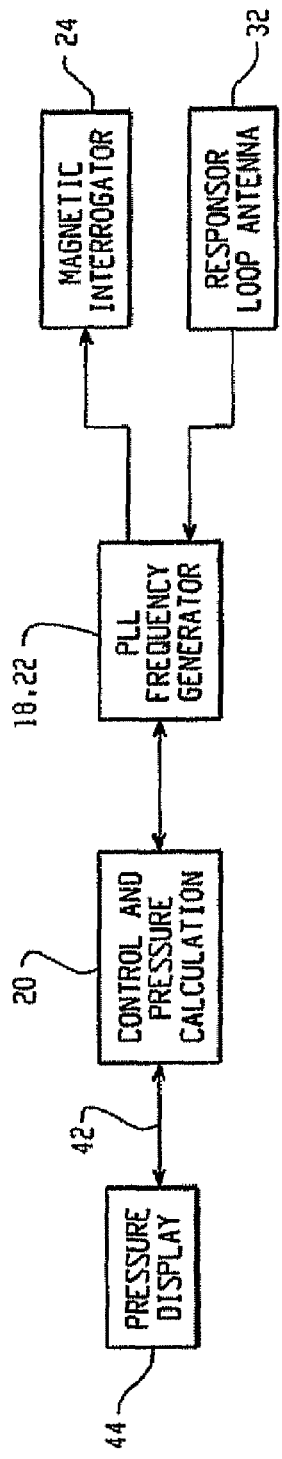
FIG. 2 is a block diagram schematic of a wireless tire pressure sensing system suitable for embodiment in a hand held device.
Figure 3:
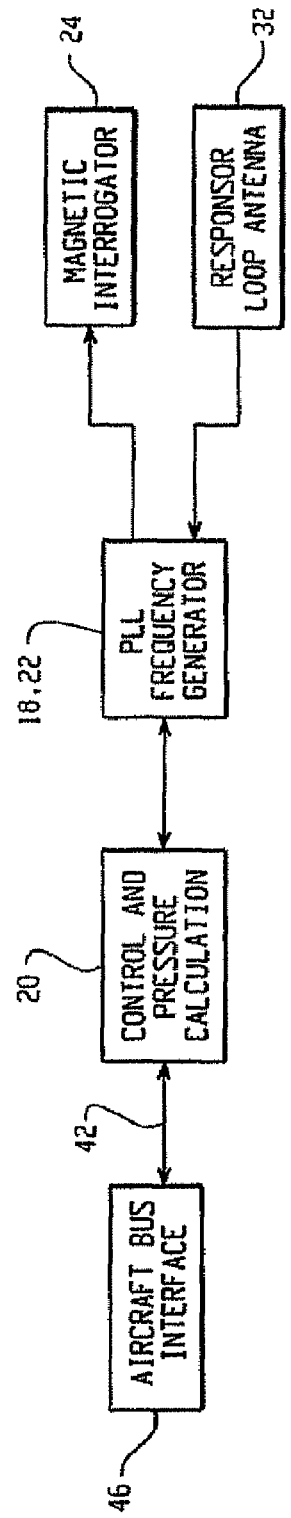
FIG. 3 is a block diagram schematic of a wireless tire pressure sensing system suitable for embodiment in an aircraft landing gear mountable device interfaceable to an aircraft bus.

1, 2 and 3. Referring to FIGS. 1, 2 and 3, since each of the dual resonant circuits include the same pair of inductor/capacitor circuit components, only one circuit 10 is shown for the present example. Each inductor formed as a wire loop 12 acts as an antenna, receiving energy transmitted by an exciter unit 14, and forming a resonant circuit with a connected capacitor sensor 16. In the present embodiment, both inductors and one capacitor of the dual resonant circuits are of fixed value, and one capacitor varies its capacitance value as the tire pressure varies as will become more evident from the description herein below. As described above, the dual inductor loops may be disposed on a single layer of temperature stable material. The layout of each inductive loop may include provisions for trimming the values of the components to compensate for variations in the manufacturing process. After trimming (if needed) there should be no requirement to calibrate the sensor, allowing the wheels of the aircraft to be interchanged with no adjustment necessary in the exciter unit 14. The dual capacitors may be disposed in a common enclosure as will become more evident from the following description. Note that the dual resonant circuits are completely passive, thus not requiring any power source on the wheel assembly. Magnetic coupling eliminates any electrical or pneumatic connections between the inside (pressure) and outside (atmospheric) sides of the tire.

The exciter or interrogator circuit 14 includes a sweep frequency oscillator 18 and a responsor receiver 20 both integrated into a phase lock loop (PLL) 22. Circuit 14 further includes a magnetic interrogator unit 24 comprising a coil of wire 26 wound around a ferrite core 28. For each pressure measurement, the oscillator 18 generates a frequency signal in the RF range to drive the coil 26 which causes the interrogator 24 to generate a magnetic field illustrated by the flux lines 30 with a swept frequency which may vary from about fourteen MHz to approximately twenty MHz, for example. Whether embodied in a hand held reader or a landing gear mounted unit, the exciter circuit 14 is disposed in proximity to the dual, resonant circuits such that the lines of flux 30 on the magnetic interrogator 24 will induce current in the inductive loops 12. The inductive loops 12 are each commonly E-field coupled to a receiving E-field loop antenna 32 to, in turn, induce current in the loop antenna 32 which is measured by a sensing circuit 34 which may be a wide bandwidth operational amplifier, for example. To avoid H-field coupling between the interrogator 24 and the E-field loop antenna 32, the loop antenna 32 is designed to receive RF signals in the E-field null range of the magnetic interrogator 24. A signal representative of the loop current measured by sensing circuit 34 is conducted over signal lines 36 to the responsor receiver 20 and coupled to the PLL 22. It is understood that the sensing circuit 34 may be also embodied in the unit 14, in which case, wires 36 carry the signal of antenna loop 32 to the unit 14 for sensing therein.

Resonance of each respective resonant circuit 10 is dependent on the capacitance of the respective capacitor sensor 16. Accordingly, during a pressure measurement, as the sweep frequency approaches resonance of each resonant circuit 10, the amplitude of the induced current in loop 32 peaks. As will become more evident from the following description, during the pressure measurement frequency sweep as exemplified in the graph of FIG. 1A, the PLL 22 locks to the resonant frequency of each resonant circuit 10. At lock at the first resonant frequency shown at 38, the frequency sweep is discontinued and the first resonant frequency is determined by a processing unit of the responsor 20. Thereafter, the PLL is unlocked permitting a continuation of the frequency sweep by the oscillator 18. At lock at the second resonant frequency shown at 40, the frequency sweep is discontinued again and the second resonant frequency is determined by the processing unit of 20. In the processing unit of 20, the difference Δf in resonant frequency between the reference and pressure variable resonant circuits 10 is converted to a signal indicative of a corrected pressure reading which is output over signal lines 42.

In a handheld interrogator version which is depicted by the block diagram schematic of FIG. 2, the output signal from unit 20 indicative of the pressure reading may be displayed in parametric units directly on a display 44 of the hand held device. In the landing gear mounted interrogator version which is depicted by the block diagram schematic of FIG. 3, the corrected pressure reading signal may be output to a communications bus 46 of the aircraft which may be an ARINC 429 for commercial aircraft, and MILSTD 1553 or FIREWIRE® bus for military aircraft, for example. In either case, both of the landing gear mounted and hand held interrogators 14 may be contained in an enclosure having approximately the same envelope as a 12-ounce soda can, for example. In addition, a non-volatile indicator which can display a low-pressure indication may be included in the interrogator 14 as will be better understood from the description herein below. The indicator would be visible during preflight inspection, and would retain its indication after aircraft power was turned off, allowing maintenance crews to quickly inspect for under inflation of an aircraft tire. Use of magnetic field transmission in the pressure sensing system to resonate the wheel mounted resonant circuits should eliminate any electromagnetic interference (EMI) problems and requirements for FCC certification. By not transmitting an electric field, the system should have an easier deployment on aircraft in all countries.

Figure 4:
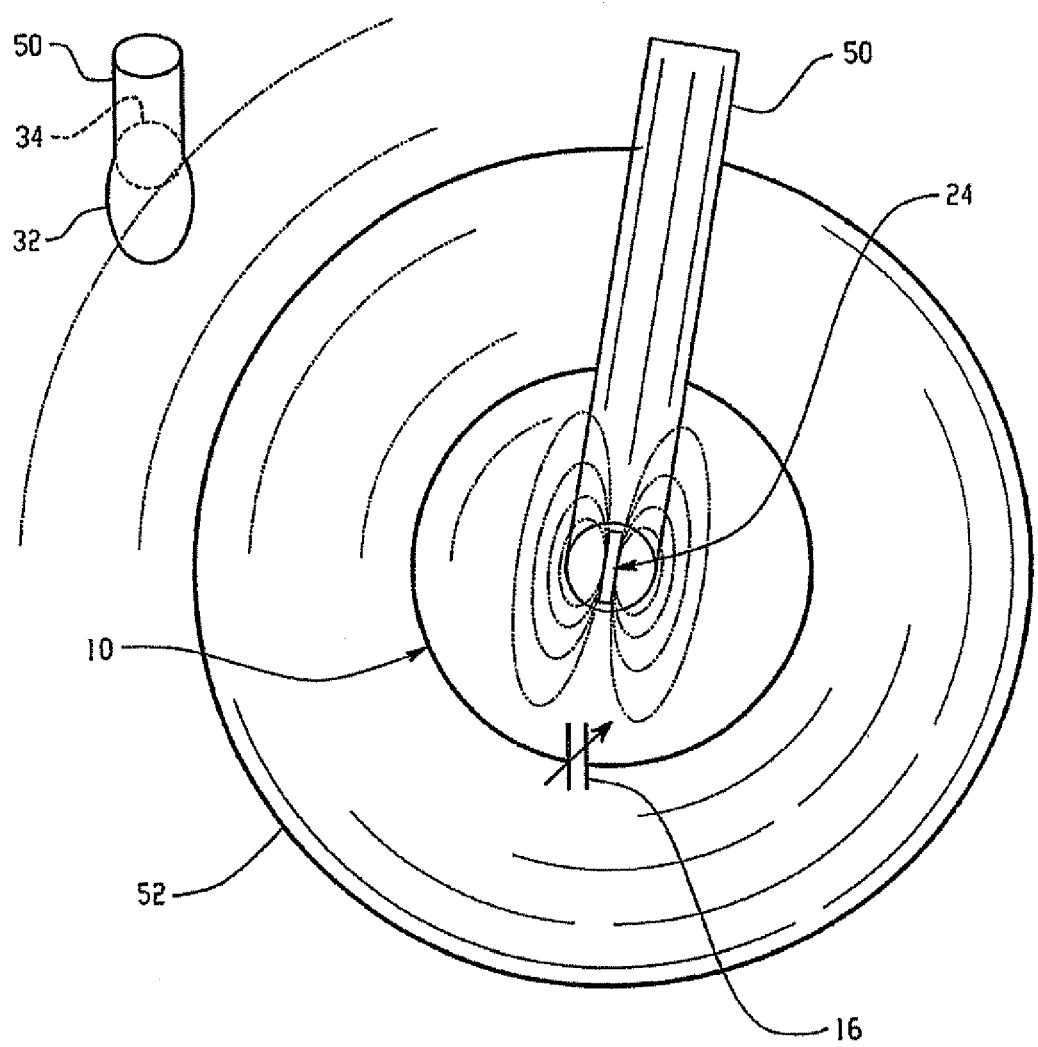
FIG. 4 is an illustration of the aircraft landing gear mountable application of the wireless tire pressure sensing system embodiment of FIG. 1.

A landing gear mounted embodiment of the one aspect of the present invention is shown in the simplified illustration of FIG. 4. Referring to FIG. 4, the magnetic interrogator 24 along with the receiving loop antenna 32 may be disposed on a stationary structure of the aircraft, like an axle 50 of a wheel and tire assembly 52, the axle 50 being part of the landing gear of the aircraft. Accordingly, both of the magnetic interrogator 24 and receiver loop 32 are mounted stationary with respect to the rotation of the aircraft wheel and tire assembly 52. Also, the dual LC transponder circuits, each comprising the loop antenna element 12 and capacitor sensor 16, are mounted to the wheel assembly 52 which rotates with respect to the axle 50. Moreover, interrogator circuits 18, 22 and 20 may be contained in a sealed enclosure 54 mounted on a strut 56 of the landing gear in proximity to the wheel 52 as shown in the illustration of FIG. 5.

Figure 5:
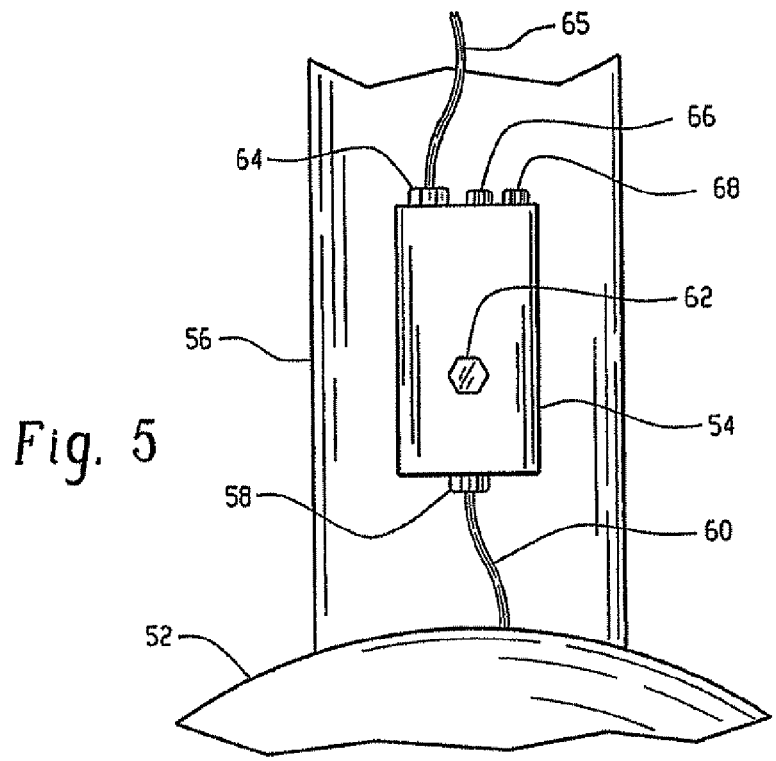
FIG. 5 is an illustration of a landing gear mountable unit suitable for use in the embodiment of FIG. 3.

Referring to FIG. 5, the enclosure 54 includes a connector 58 for connecting a cable 60 including the wiring 26 and 36 from the interrogator 24 and the receiving loop element 32, respectively, which may be mounted on the axle 50 of wheel 52 as described in connection with FIG. 4. The wires of cable 60 coupling the magnetic interrogator 24 and receiving loop element 32 may be run through the axle 50 to the circuits of the enclosure 54. Enclosure 54 may also include the non-volatile indicator 62 which may be a latched relay showing a red window when the relay is energized indicative of tire under pressure. The enclosure 54 may be mounted on strut 56 in such a manner so that the indicator 62 is conveniently viewable by an inspector during preflight inspection. Moreover, the enclosure 54 includes another connector 64 to accommodate a connection to the wiring of the aircraft bus 65. Other connectors 66 and 68 may be included to connect respective sensor inputs from other pressure sensors mounted on or close to the landing gear, like a strut pressure sensor and a brake pressure sensor, for example. The circuitry of the unit 54 may be powered by an aircraft power source supplied over the aircraft bus lines 65, for example.

Figure 6:
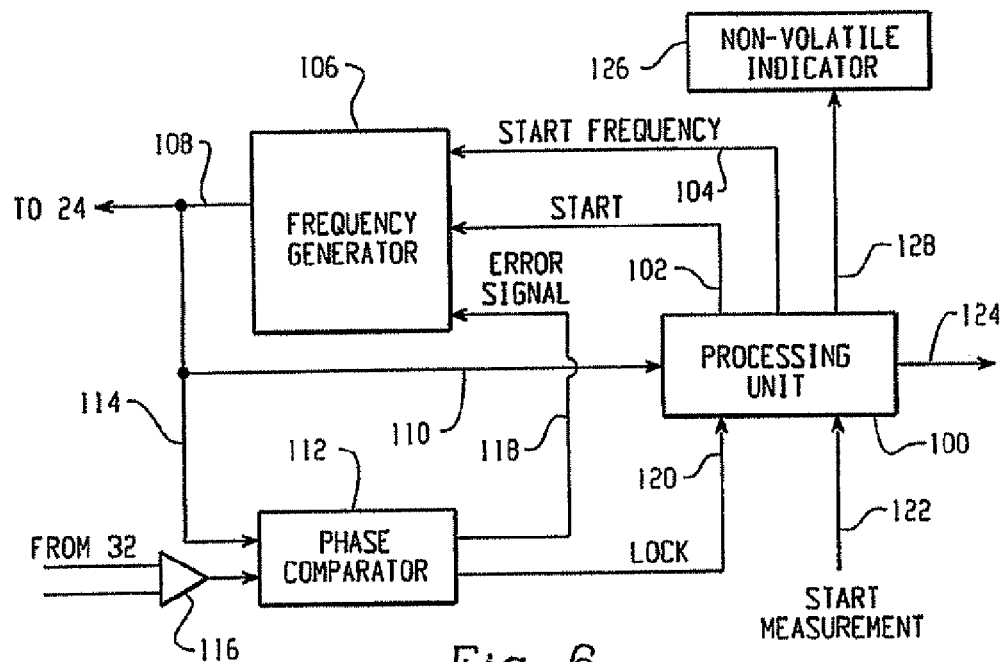
FIG. 6 is a block diagram schematic of exemplary phase lock loop and processing circuits suitable for use in the embodiment of FIG. 1.

A block diagram schematic of circuitry suitable for embodying the circuits 18, 20 and 22 enclosed in the enclosure 54 is shown in FIG. 6. Referring to FIG. 6, a processing unit 100 which may be a microprocessor-based circuit, for example, is programmed to perform the control and pressure calculations of unit 20 as described herein above. Under program control, unit 100 provides a start signal over signal line 102 and a start frequency over signal lines 104 to a frequency generator 106 which generators a frequency signal over lines 108. The frequency signal over 108 may be in the form of a square wave, for example. The signal lines 108 may be coupled to the magnetic interrogator 24 to drive the coils 26 thereof, to digital inputs of the processing unit 100 over line 110, and to an input of a phase comparator circuit 112 over line 114. The E-field loop 32 may be coupled from lines 36 to differential inputs of a wide band operational amplifier 116, the output of which being coupled to another input of the phase comparator circuit 112. A phase error signal output of the comparator 112 drives the frequency generator 106 over signal line 118 and a lock signal output of the comparator 112 indicative of phase lock is provided to an input of the processing unit 100 over line 120. In addition, a start measurement signal is provided to an input of unit 100 over signal line 122. The start signal 122 may be supplied from a pushbutton on the hand-held device or from the aircraft bus interface.

Figure 1A:
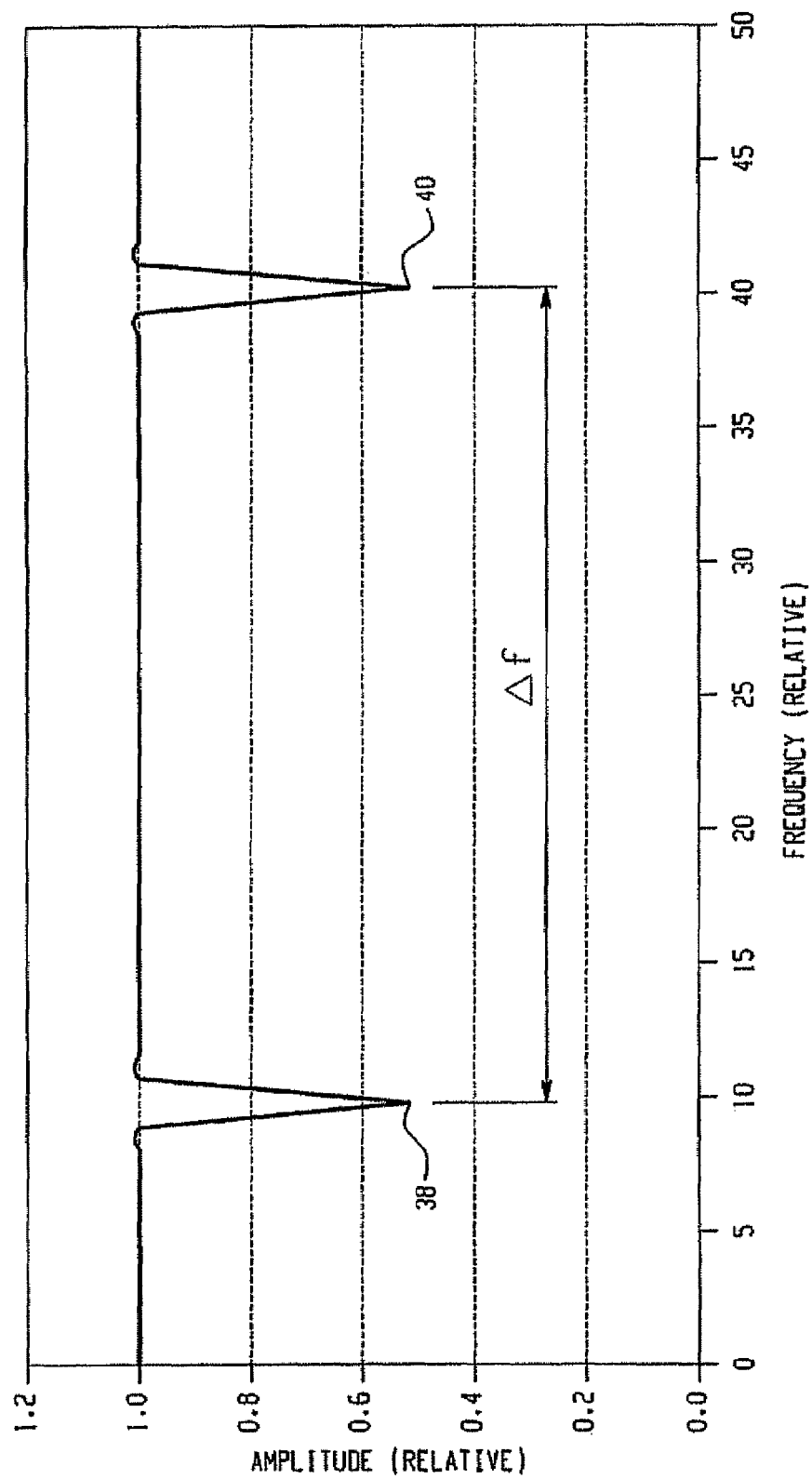
FIG. 1A is a graph exemplifying a sensor frequency response of the system embodiment of FIG. 1.

In operation, the processing unit 100 may be maintained in a power saving sleep mode until it receives the start measurement signal 122. Then, under program control, the processing unit 100 provides the start signal 102 and start frequency 104 to the frequency generator 108. The phase lock loop is designed in the present embodiment such that the starting frequency generated by circuit 106 is out of phase from the anticipated resonance frequency of the system. The phase comparator circuit 112 compares the phase of the generated frequency over line 114 with the frequency of the received E-field signal (output of amplifier 116). The phase error signal 118 of the comparator circuit 112 causes the frequency generator to continue to sweep across a frequency range from the start frequency until the phase error signal goes to zero which is indicative of frequency lock condition. In the present embodiment, from start to lock may take less than one millisecond. Under frequency lock, the frequency generator 106 dwells at the first resonance frequency 38 as shown in FIG. 1A.

At frequency lock, the lock signal 120 provided to the processing unit 100 causes the unit 100 to execute a program to determine the first resonance frequency from the pulsed signals over line 110. For example, under program control, the unit 100 may count the number of pulses in a counter register over a predetermined period, like on the order of one second, for example. The total count from the counter indicative of the first resonance frequency may be stored in a temporary register of the unit 100. Thereafter, the unit 100 may be programmed to provide a new start frequency beyond the first resonance frequency over lines 104 and another start signal over line 102. In response, the frequency generator 106 generates a signal over lines 108 at the new start frequency which is by design out of phase with the next resonance frequency. The non-zero phase error signal 118 of the comparator circuit 112 causes the frequency generator to continue to sweep across a frequency range from the new start frequency until the phase error signal goes to zero again indicative of the second frequency lock condition. Under frequency lock, the frequency generator 106 dwells at the second resonance frequency 40 as shown in FIG. 1A. In response to the lock signal, the processing unit 100 may then determine the second resonance frequency in the same manner as the first and then, subtract the first and second frequencies to determine the frequency difference which is indicative of the compensated tire pressure measurement. A signal representative of the tire pressure measurement may be output from the unit 100 over lines 124.

The processing unit 100 may be also programmed to compare the compensated tire pressure measurement to a predetermined pressure and control a non-volatile indicator 126 over signal line 128 to different states based on the outcome of the comparison, i.e. whether the compensated tire pressure measurement is above or below the predetermined pressure.

Figure 7:
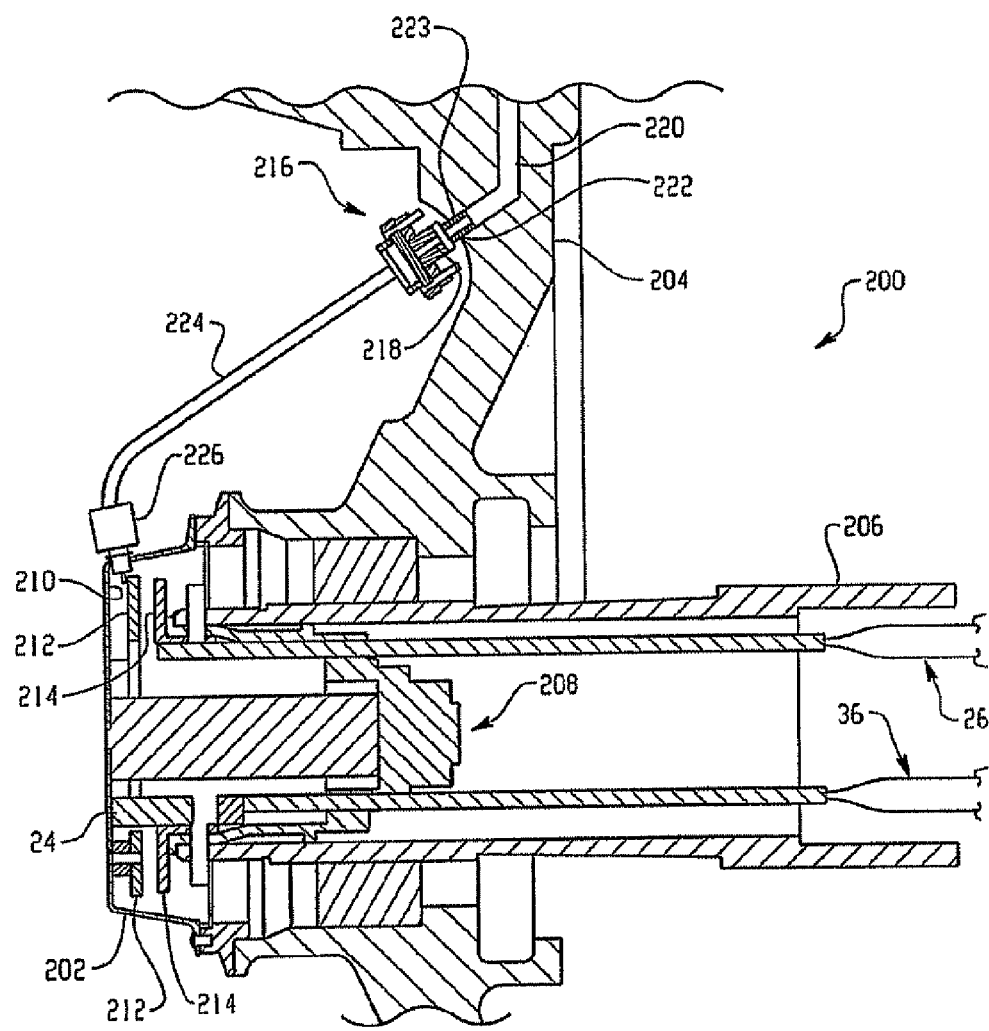
FIG. 7 is a cross-sectional illustration of an integrated aircraft wheel assembly suitable for embodying the wireless tire pressure sensing system on an aircraft.
Figure 8:
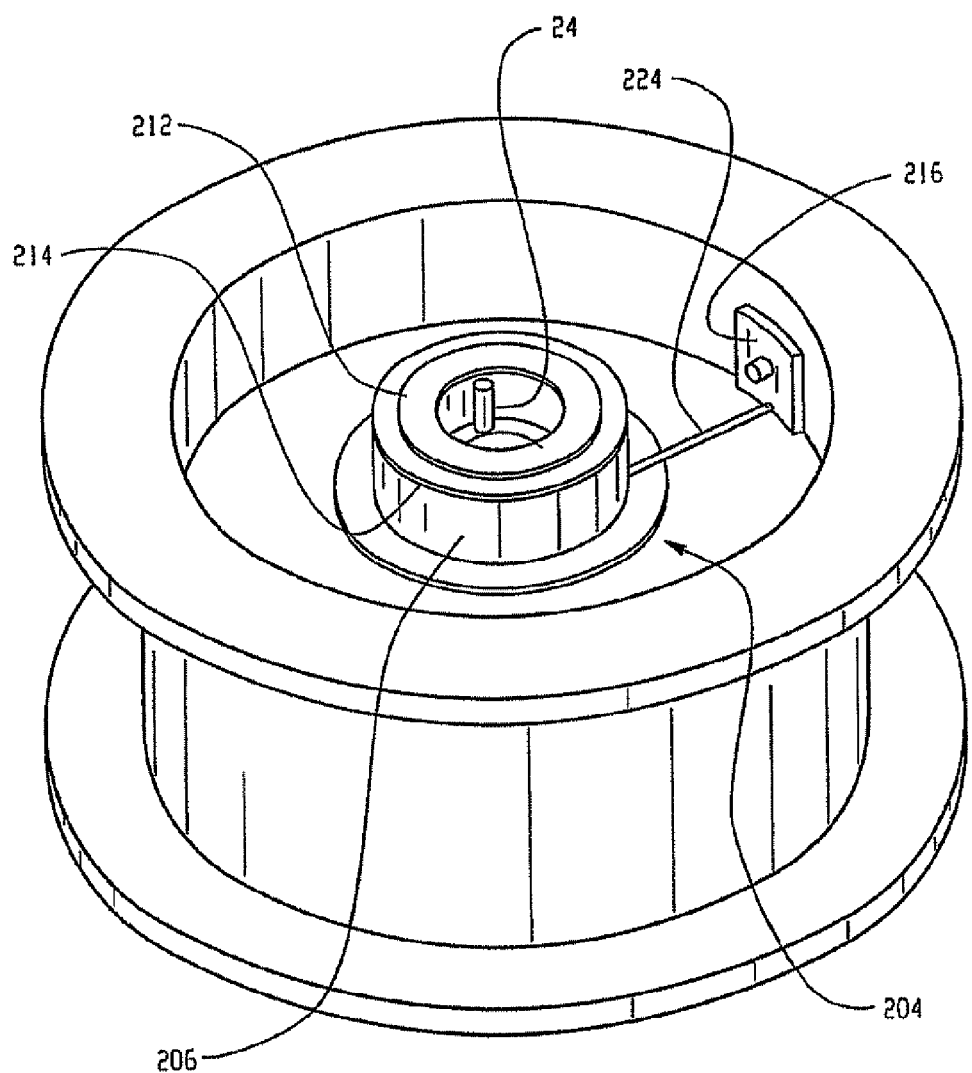
FIG. 8 is a cut-away, isometric perspective of the integrated aircraft wheel assembly of FIG. 7.

A cross-sectional illustration of an integrated aircraft wheel assembly 200 suitable for embodying the principles of the present invention is shown in FIG. 7 and an isometric perspective of the wheel rim of the assembly 200 is shown in FIG. 8. Referring to FIGS. 7 and 8, a hubcap 202 is mounted to a wheel rim 204 of assembly 200. In the isometric perspective illustration of FIG. 8, the hubcap 202 is cutaway to reveal the elements mounted thereto. The rim 204 is rotationally supported on an axle 206 which includes a central structure 208 extending out from the axle 206 to the hubcap 202. The diameter of the central structure 208 is substantially less than the diameter of the axle 206. Mounted to an inside flat surface 210 of the hubcap 202 is an annular shaped PC board layer 212. The dual inductor wire loops 10 may be disposed on a surface of the layer 212. While only one layer 212 is shown in FIG. 7, it is understood that an embodiment of two similarly shaped layers sandwiched together with each layer having one of the dual loops 10 disposed thereon may work just as well. Another similar annular shaped PC board layer 214 may be mounted to the axle 206 and have disposed on a surface thereof the E-field receiving loop 32. The surfaces of the layers 212 and 214 on which the loops 10 and 32 are disposed should be mounted substantially parallel to each other and within a distance of no greater than twelve inches or approximately five centimeters apart, for example.

The central structure 208 protrudes through the centers of the annular shaped layers 212 and 214 to the surface 210 of the hubcap 202. The magnetic interrogator 24 is disposed on the central structure 208 at a point near the surface 210 in close proximity to the dual loops 10 of layer(s) 212 so that its magnetic field is directed to induce a current in the dual loops 12 while not affecting substantially the E-field receiving loop 32. Wires 26 may extend from the landing gear strut mounted unit 54 through the center of axle 206 to the magnetic interrogator 24. Likewise, wires 36 may extend from the receiving loop 32 of PC board layer 214 through the center of axle 206 to the strut mounted unit 54 as described herein above in connection with FIG. 5.

In the present embodiment, dual, variable capacitance pressure sensors 16 are disposed in a common enclosure, like a TO-5 can, for example, of a sensor assembly 216. A hollow metal tube 218 is attached to the base of the TO-5 can of assembly 216 and is insertable into a cavity 220 of the wheel rim 204 at an insertion point 222. The cavity 220 extends from the insertion point 222 up through the rim 204 to the tire pressure chamber (not shown). A hole (not shown) is provided in the base of the TO-5 can at a point where the tube 218 is attached so that pressure from the tire chamber may be sensed by a pressure sensor in the assembly 216 via the path through cavity 220, tube 218 and the hole in the base of the assembly 216 as will become more evident from the description found herein below. A seal 223 may be included around the tube 218 at the insertion point 222 to ensure against air leakage from the cavity 220 to the atmosphere. Wiring from the dual pressure sensors of assembly 216 may be provided to their respective inductor loops in the hubcap 202 through a cable 224, which may be a coax cable, for example, and a connector 226, which may be a coax connector. The connector 226 is disposed through a wall of the hubcap 202 to permit the wiring thereof to pass through the wall and be connected to their respective loops on PC board layer(s) 212.

Figure 9:
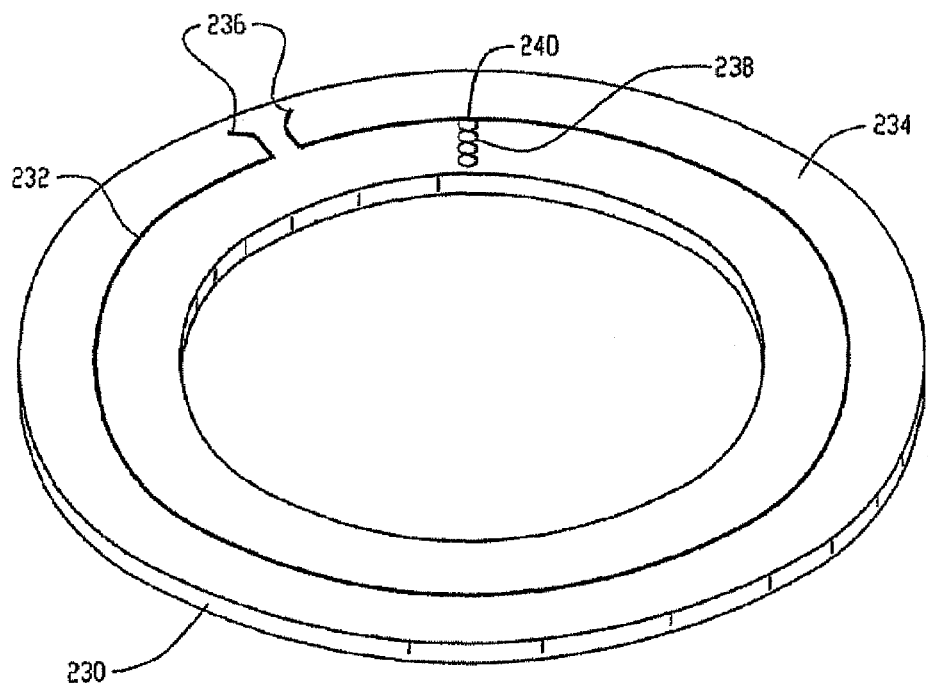
FIG. 9 is an illustration of an annular PC board layer suitable for use in the embodiments of FIGS. 7 and 8.

FIG. 9 is an illustration of an annular PC board layer 230 suitable for use as either the annular shaped layer(s) 212 or layer 214 in the embodiment of FIG. 7. Referring to FIG. 9, a wire loop 232, which may be in the form of a copper tape, for example, is disposed on a surface 234 of the layer 230. Wire leads 236 of the wire loop 232 may extend out from the tape at an opening in the loop for providing connection points to the respective wiring through soldering, for example. If the layer 230 is embodying a single layer 212 then an additional loop may be disposed on a surface of the layer 230 with its own set of connecting leads. Accordingly, each set of connecting leads 236 are connected to the respective pressure sensor in assembly 216 via connector 226 and cable 224 (see FIG. 7). Of course, if layer 230 is embodying one of a dual layer structure, then two layers 230 may be sandwiched together to form the dual layer assembly. If the layer 230 is an embodiment of layer 214, then wire leads 236 are connected to the wires 36 via soldering, for example.

In addition, wire circles 238 may be provided on surface 234 at a point 240 of loop 232 to increase the length and inductance of the loop 232 to provide an inductance range around the contemplated operational resonance frequency of the respective resonant circuit. Trimming the inductance to compensate for variations in the manufacturing process may be accomplished with the present embodiment by cutting or interrupting the connection of one or more of the wire circles from the wire loop 232, for example. In this manner, once trimmed, there is no further need to calibrate the resonant circuits, allowing the wheels to be changed with no adjustment in the exciter unit.

Figure 10:
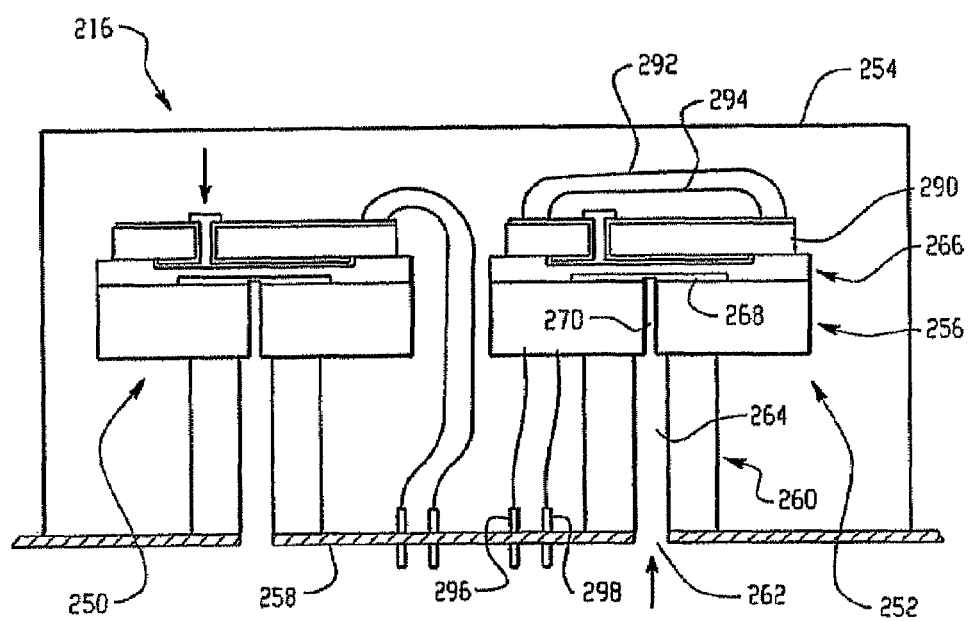
FIG. 10 is a cross-sectional illustration of exemplary dual variable capacitance pressure sensor assembly suitable for use in the embodiment of FIG. 1.

FIG. 10 is a cross-sectional illustration of dual variable capacitance pressure sensors suitable for use in the sensor assembly 216 of the embodiment of FIG. 7. Referring to FIG. 10, two variable capacitance pressure sensors 250 and 252 are disposed within a sealed TO-5 can 254. In the present embodiment, the sensors 250 and 252 are of the micro-electro-mechanical system or MEMS type fabricated from a silicon substrate and are substantially identical in structure. Each of the MEMS pressure sensors 250 and 252 may be of the type manufactured by Goodrich Sensor Systems under the model or part no. 02011-0910-0750, for example. Each MEMS pressure sensor 250 and 252 includes a silicon substrate 256 which is supported from the base 258 of the can 254 by a cylindrical hollow pedestal 260 and acts as one plate of a capacitive element. A hole 262 is provided in the base 258 aligned with the hollow portion 264 of the pedestal 260 of one of the MEMS sensors 252. The hollow pedestal of the other sensor 250 is sealed by the base 258. The other plate of the capacitive element is formed in each MEMS sensor by fabricating a silicon diaphragm 266 over and electrically isolated from the substrate layer 256 creating a chamber 268 between the plate of the diaphragm 266 and the plate of the substrate 256. A pathway 270 is provided in the substrate 256 between the hollow portion 264 and chamber 268.

Figure 11A:
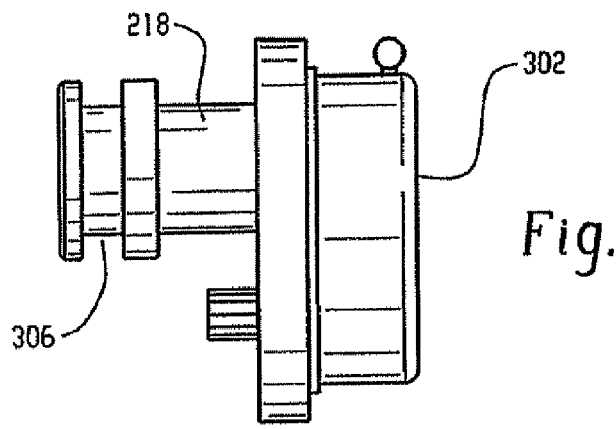
FIGS. 11A, 11B and 11C are profile, top, and side views of the dual sensor assembly of FIG. 10.
Figure 11B:
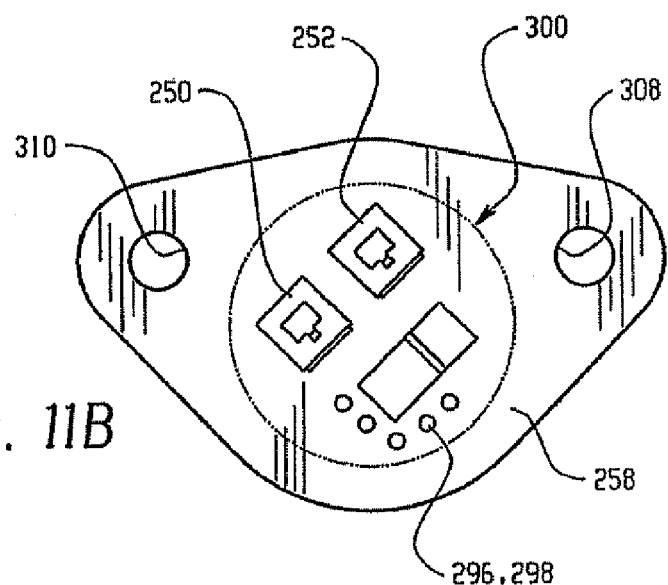
Figure 11C:
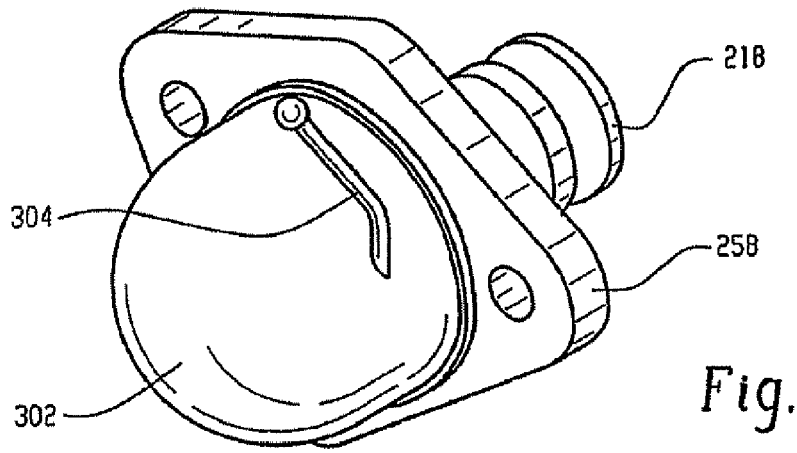

Contacts to the aforementioned plates of the capacitive element of each MEMS sensor 250 and 252 are provided at 290 and wire leads 292 and 294 may be connected to each contact for connecting the capacitive plates to pins 296 and 298 which penetrate the base 258 for external sensor connections. Profile, top and isometric illustrations of the TO-5 can 254 of the dual sensor assembly are shown in FIGS. 11A, 11B and 11C, respectively. Referring to FIGS. 11A, 11B and 11C, once the MEMS sensors 250 and 252 are disposed on the base 258 in the region 300 and connections are made to the pins 296 and 298, a cover 302 is disposed over the region 300 and sealed to the base 258. The hollow tube 218 is affixed to the base 258 concentrically aligned with the hole 262. A vacuum is created in the sealed volume under the cover 302 by drawing air through a tube 304 in the cover 302. Once the vacuum is created, the tube 304 is sealed to maintain the vacuum. A seal (not shown), which may be an O-ring, for example, is disposed around the periphery of the tube 218 at section 306 prior to the tube 218 being inserted in the cavity 220. Once the tube 218 is positioned in place, the assembly 216 may be secured to the wheel rim 204 by screws through screw holes 308 and 310, for example.

Accordingly, air pressure from the tire chamber is sensed in chamber 268 of sensor 252 via the path formed by cavity 220, tube 218, hole 262, hollow pedestal portion 264, and substrate pathway 270. Pressure in chamber 268 causes the capacitive plate of diaphragm 266 to move with respect to the capacitive plate of stationary substrate 256, thus varying the capacitance in proportion to the sensed pressure. The capacitance of sensor 252 will also vary with changing temperature and other parameters. Since sensor 250 is not sensing tire pressure, the capacitance thereof will only vary with the changing temperature and other parameters which are substantially the same for both sensors. In addition, the inductor loops of the dual resonant circuits are fixed and temperature stabilized for the most part. Any variation in inductance of the dual loops due to the changing temperature and other parameters will be substantially the same for both loops. Accordingly, the resonant frequency of the reference LC circuit may be used to compensate the resonant frequency of the pressure measuring LC circuit by taking the differential resonant frequency between the two as described herein above in connection with FIG. 1A.

In addition to tire pressure, wheel speed may be also sensed wirelessly by the foregoing described embodiment(s) with a minor modification and/or addition of one or more components. The basic concept of wireless wheel speed sensing utilizing the present tire pressure sensing embodiment(s) is to cause a rate of amplitude modulations of the variable frequency magnetic field between the rotational and static loop circuits commensurate with the wheel speed. One technique for creating the rate of amplitude modulations is to provide breaks or interruptions, i.e. inductive discontinuities, in the magnetic coupling between the interrogator 24 and resonant loop 10. The illustration of FIG. 12 depicts the addition of a shuttering mechanism 320 to the embodiment of FIGS. 7 and 8 for this purpose.

Figure 12:
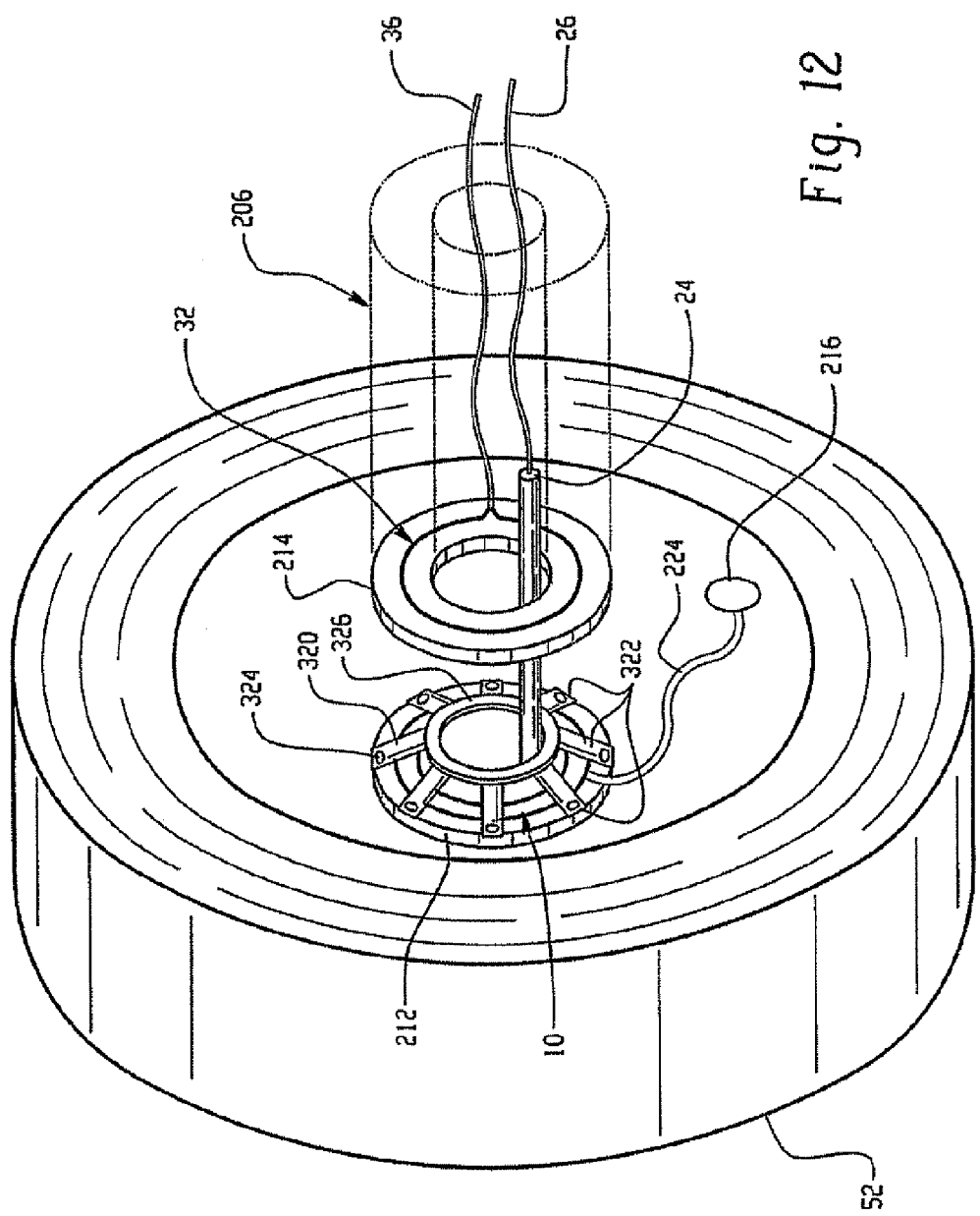
FIG. 12 is an illustration of an exemplary wireless tire pressure and/or wheel speed sensing system suitable for embodying another aspect of the present invention.

In the embodiment of FIG. 12, reference numerals for system components that have been described herein above in connection with the wireless tire pressure system will remain the same. No further description will be given to system components previously described. Referring to FIG. 12, the shuttering mechanism 320 comprises a plurality of magnetic shield gratings 322 that are disposed on the insulating layer 212 about the perimeter of wire loop 10 at predetermined spacing intervals. The gratings 322 are constructed of a high conductivity material such as Aluminum, for example, for RF magnetic shielding. Generally, RF magnetic shielding balances EMI type shielding vs high permeability materials. The gratings 322 may be disposed on both sides of the layer 212 in which the loop 10 is embedded. More specifically, each of the gratings 322 is attached at one end by fasteners 324 to a surface of the layer 212, cantilevered over top of the loop 10, and isolated therefrom. The fasteners 324, which may be screws, for example, extend through the layer 212 to a grounded surface such as the wheel hub, for example, to provide an electrical grounding for each of the gratings 322 so they do not become a re-radiator of the magnetic field themselves. The inductive loop 10 is electrically insulated from the electrical ground and structurally supported within layer 212 which may be constructed of a plastic material for the present embodiment.

To provide additional structural support to the gratings 322, if needed, a circular ring 326 may couple together the unattached ends of the gratings 322. The center hole of the ring 326 is aligned substantially with the center hole of the layer 212. The outer diameter of the circular ring 326 is less than the diameter of the inductive loop 10, but the gratings 322 extend over the loop 10 to act as barriers or shields to the magnetic field between the magnetic interrogator 24 and the loop 10. The ring 326 is also electrically grounded through its contact with the grounded gratings 322.

Figure 13A:
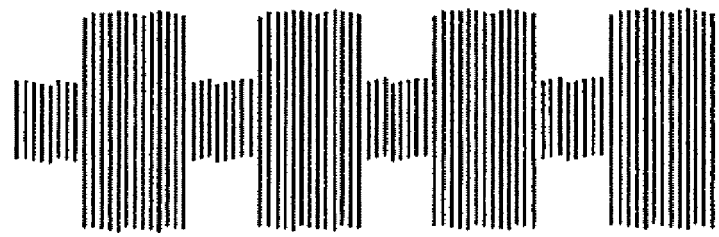
FIGS. 13A-13C are graphs of exemplary operational waveforms for speed sensing in the system embodiment of FIG. 12.

Since the gratings 322 are attached to the layer 212 which is affixed to the wheel hub, they will rotate with the wheel. Accordingly, the variable frequency E-field signal received over signal lines 36 will have a rate of amplitude modulations commensurate with wheel rotational speed as illustrated in the exemplary waveform of FIG. 13A. The signal over lines 36 may be sensed by the wide frequency bandwidth operational amplifier as described above in connection with the embodiment of FIG. 6 and provided to a wheel speed detector circuit 340 which is added to the tire pressure sensing system embodiment described in connection with FIG. 3. The modified embodiment is shown in the block diagram schematic of FIG. 14. The wheel speed detector circuit 340 determines wheel speed from the sensed, amplitude modulated E-field signal shown by way of example in FIG. 13A. In the embodiment of FIG. 14, a signal representative of wheel speed is provided to the aircraft bus via bus interface 46 over signal lines 342.

Figure 13B:
Figure 13C:
Figure 13D:
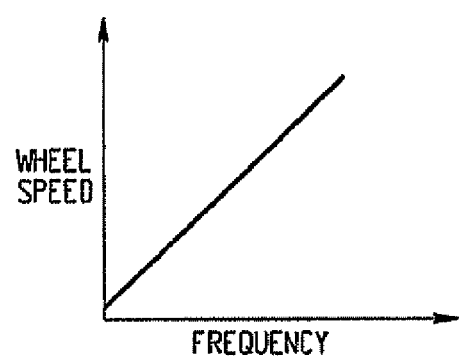
FIG. 13D is a graph of a conversion function suitable for use in the embodiment of FIG. 12.

FIG. 15 is a block diagram schematic of an exemplary wheel speed detector circuit 340 suitable for use in the embodiment of FIG. 14. Referring to FIG. 15, the sensed E-field signal is received and rectified by a rectifier circuit 344 which may perform either a full wave or half-wave rectification. The resultant waveform which is shown by way of example in FIG. 13B is passed to a low-pass filter circuit 346 which filters out the higher frequency components of the waveform. The filtered waveform results in amplitude modulated pulses as shown by way of example in FIG. 13C. The frequency of the pulses are commensurate with the wheel speed. A circuit 348 determines the frequency of the pulses of the rectified and filtered signal by way of a frequency counter, for example, and converts the determined frequency to a signal representative of wheel speed according to a predetermined function which is exemplified in the graph of FIG. 13D. The wheel speed signal is output from the circuit 348 over signal lines 342 to the bus interface 46. In this manner, wheel speed may be wirelessly sensed by the modified tire pressure system embodiment of FIGS. 12, 14 and 15.

If the gratings 322 do not provide a desired amplitude modulation of the variable frequency signal, then a second set of gratings aligned concentric to the first may be added to the embodiment of FIG. 12. The second set of gratings may be static in relation to the first set of gratings 322 which rotates as described above. The second set of gratings may be attached to a surface of the layer 214 as shown in FIG. 12 over the receiving loop 32 in a similar manner as described for the first set of gratings 322, for example, except that the second set of gratings are structurally and electrically attached to the axle 214 or associated static parts using fasteners or welding techniques. The axle 214 or associated static parts are grounded. The E-field loop 32 would be electrically insulated from electrical ground and structurally supported within layer 214 which is constructed of a plastic material for the present embodiment. As the wheel rotates, openings between the gratings of two sets of gratings are created at a rate commensurate with wheel speed. This embodiment will create a larger change in amplitude in the received signal, since it creates effectively a complete shield at regular points during the rotation of the wheel.

While the present embodiment employs a rotating plurality of gratings 322 or a rotating and static set of gratings as described above to achieve the desired amplitude modulations, it is understood that other embodiments or even other shuttering mechanisms may be employed without deviating from the broad principles of the present aspect of the invention. Such other shuttering mechanisms may take the form of holes or apertures in a disc attached above the loop 10 or a combination of fixed and a static holed discs as described above. Wired spokes that act as RF magnetic shields may be used instead of gratings to provide the desired modulations in the RF throughput.

Another possible technique to sensitize the magnetic field to wheel rotation is to alter the shapes of the transponder and receiver loops. By changing the shape of the transmitting and receiving loops the distance between the two loops 10 and 32 varies as the wheel rotates. The science of Physics dictates that the transmitting of electromagnetic radiation will vary with the inverse of the square of the distance between the loops 10 and 32. Therefore, as this distance varies with rotation, the E-field signal will be amplitude modulated commensurate with wheel speed.

Figure 16:
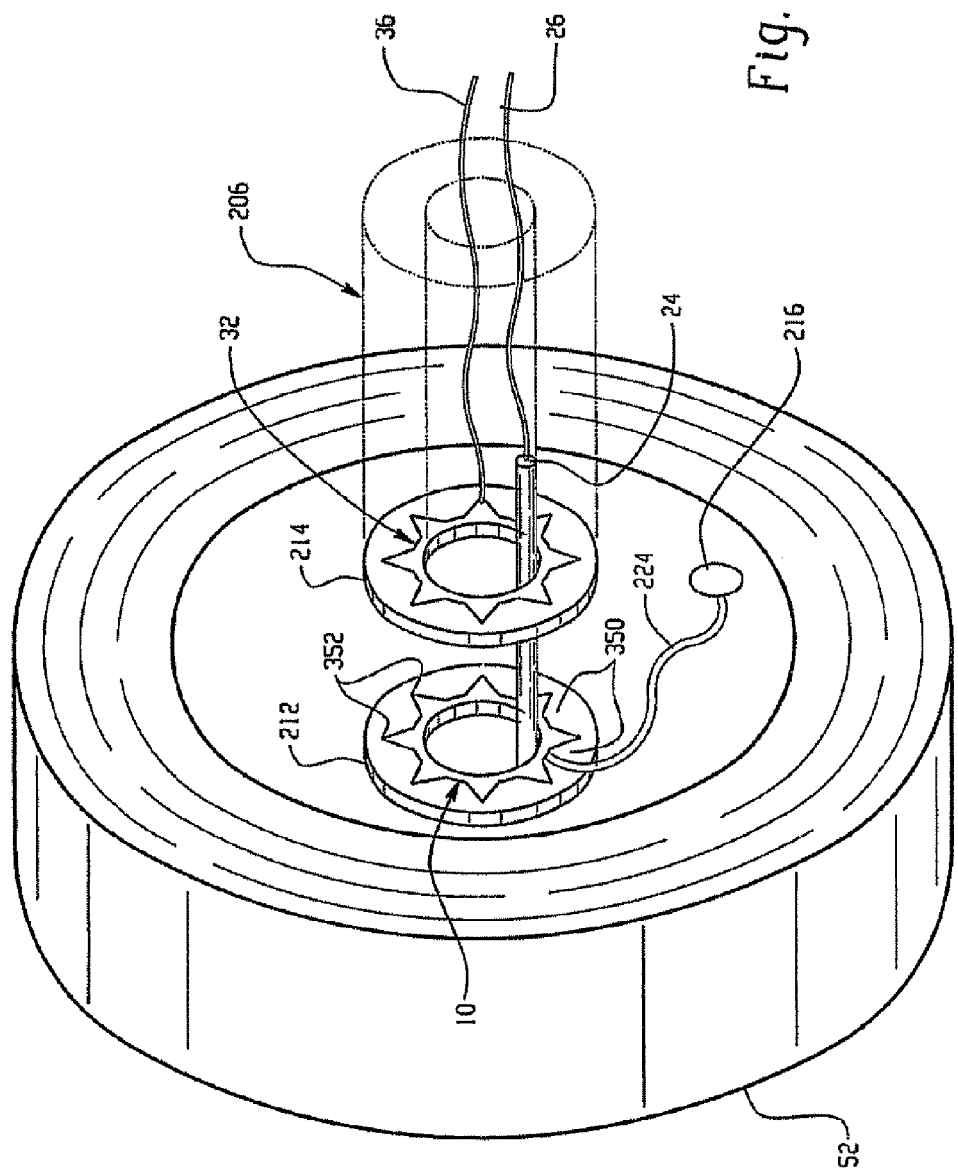
FIG. 16 is an illustration of an alternate embodiment of the wireless tire pressure and/or wheel speed sensing system.

A modified system suitable for embodying this principle is shown by the illustration of FIG. 16. In the embodiment of FIG. 16, reference numerals for system components that have been described herein above in connection with the wireless tire pressure system will remain the same. No further description will be given to system components previously described. Referring to FIG. 16, the inductive wire loop 10 may be shaped on the surface of layer 212 in the form of a multiple pointed star with regular distance intervals 350 around the wire perimeter between star apexes 352. The E-field loop 32 may be shaped on the surface of layer 214 in the same or similar form as that of the wire loop 10. Accordingly, as the star shaped wire loop 10 rotates past the static star shaped wire loop 32, the star apexes 352 thereof will align at regular intervals in time and create amplitude modulations in the signal 36 at a rate commensurate with wheel speed. The received signal 36 may be processed by the wheel speed detector circuit 340 in the same or similar manner as described herein above.

It is understood that while the present embodiment shapes the wire loops into multiple pointed stars to achieve the desired amplitude modulations, other shapes of the wire loops are possible without deviating from the broad principles of the present aspect of the invention. Such other shapes may take the form of square waves or sine waves or any shape that varies radially or axially in a regular pattern, for example.

Another possible technique to effect the desired amplitude modulation for wireless wheel speed sensing is to locate ferro-magnetic material relative to the magnetic interrogator 24 and transponder loop 10 in order to enhance or detract the magnetic coupling therebetween. The use of ferrite material embedded in the insulated layer 212 at regular intervals and in close proximity to the transmitting loop 10 will create a distortion of the RF magnetic waves, resulting in a deviation in the characteristic of the magnetic flux lines intersecting the transmitting loop 10 and, in turn, a fluctuation in the E-field signal as the wheel rotates. This technique may be also used in the same or similar manner as described herein above for the grating embodiment of FIG. 12 with ferrite material embedded near both loops 10 and 32, for example.

While the present invention has been described herein above in connection with one or more embodiments, it is understood that these descriptions are provided merely by way of example. Accordingly, the present invention should not be limited in any way by such description, but rather construed in breadth and broad scope in accordance with the recitation of the claims appended hereto.

What is claimed is:

1. A wireless tire pressure and wheel speed sensing system for an aircraft, said system comprising:
   a resonant circuit mounted to a wheel of the aircraft for monitoring the pressure of a tire mounted to said wheel, said resonant circuit comprising a wire loop of a predetermined inductance;
   an interrogating circuit magnetically coupleable to said resonant circuit and operative to induce magnetically a variable frequency current in the wire loop of said resonant circuit, said resonant circuit generating a corresponding variable frequency electric field in response to said induced current, said variable frequency electric field including a resonant frequency commensurate with the pressure of said tire;
   a magnetic field altering apparatus for alternating the magnetic coupling between said wire loop and said interrogating circuit to cause a rate of amplitude modulations of said variable frequency electric field commensurate with said wheel speed;
   a receiving circuit E-field coupleable to said resonant circuit and operative to receive said amplitude modulated variable frequency electric field of said resonant circuit and to generate a signal representative thereof;
   a first processing circuit coupled to said receiving circuit for processing said signal to generate a pressure reading of said tire based on the resonant frequency thereof; and
   a second processing circuit coupled to said receiving circuit for processing said signal to generate a wheel speed reading based on the rate of amplitude modulations thereof.

2. The system of claim 1 wherein the magnetic field altering apparatus comprises a plurality of magnetic field gratings disposed on the wheel about the perimeter of the wire loop at predetermined intervals for rotation therewith, said gratings acting as shutters to the magnetic coupling at the predetermined intervals during wheel rotation.

3. The system of claim 2 wherein the gratings are electrically grounded to prevent the radiation of a magnetic field therefrom.

4. The system of claim 1 wherein the magnetic field altering apparatus comprises first and second concentrically disposed pluralities of magnetic field gratings, said first plurality of gratings disposed on the wheel about the perimeter of said wire loop at predetermined intervals for rotation therewith, and said second plurality of gratings mounted stationary with respect to said first plurality of gratings, said first and second pluralities of gratings acting as shutters to the magnetic coupling at the predetermined intervals during wheel rotation.

5. The system of claim 1 wherein the magnetic field altering apparatus comprises a plurality of elements of ferromagnetic material disposed on the wheel about the perimeter of said wire loop at predetermined intervals for rotation therewith.

6. The system of claim 1 wherein the magnetic field altering apparatus comprises a plurality of permanent magnets disposed on the wheel about the perimeter of said wire loop at predetermined intervals for rotation therewith.

7. The system of claim 1 including an aircraft bus; and wherein the first and second processing circuits are coupled to said aircraft bus for conducting the tire pressure reading and wheel speed reading over the aircraft bus.

8. A wireless wheel speed sensing system for an aircraft, said system composing:
   a wire loop mounted to a wheel of the aircraft and rotating therewith;
   an interrogating circuit magnetically coupleable to said rotating wire loop and operative to induce magnetically a current signal in said rotating wire loop, said rotating wire loop generating a corresponding electric field in response to said induced current;
   a magnetic field altering apparatus for alternating the magnetic coupling between said wire loop and said interrogating circuit to cause a rate of amplitude modulations of said electric field commensurate with said wheel speed; and
   a receiving circuit statically mounted with respect to the rotating wheel, said receiving circuit operative to receive said amplitude modulated electric field and to generate a signal representative of wheel speed.

9. The system of claim 8 wherein the magnetic field altering apparatus comprises a plurality of magnetic shield gratings disposed about the perimeter of the wire loop at predetermined intervals and insulated therefrom, said magnetic shield gratings acting as shutters to the magnetic coupling at the predetermined intervals during wheel rotation.

10. The system of claim 9 wherein the magnetic shield gratings are electrically grounded to prevent the radiation of a magnetic field therefrom.

11. The system of claim 8 including a support layer mounted to the rotating wheel; wherein the wire loop is disposed at the support layer; and wherein the altering apparatus includes a plurality of magnetic shield gratings disposed on a first side of the layer about the perimeter of the wire loop at predetermined intervals, each grating attached at one end to the first side of the support layer and cantilevered over the wire loop, said gratings acting as shutters to the magnetic field at the predetermined intervals during wheel rotation.

12. The system of claim 11 wherein the altering apparatus includes a second plurality of magnetic shield gratings disposed on a second side of the layer about the perimeter of the wire loop at predetermined intervals, each grating of the second plurality attached at one end to the second side of the support layer and cantilevered over the wire loop.

13. The system of claim 11 wherein the wire loop is embedded in the support layer.

14. The system of claim 11 wherein the support layer is mounted to a hub of the wheel.

15. The system of claim 11 including a supporting ring for coupling together the unattached ends of the plurality of gratings.

16. The system of claim 11 wherein the receiving circuit comprises a statically mounted wire loop concentric with the rotating wire loop; and wherein the altering apparatus includes a second plurality of magnetic shield gratings disposed at predetermined intervals about a static perimeter concentric with the rotating perimeter of the wire loop.

17. The system of claim 16 wherein the static wire loop and second plurality of magnetic shield gratings are mounted to an axle of the wheel.

18. The system of claim 8 including an aircraft bus; and wherein the receiving circuit is coupled to said aircraft bus for conducting the wheel speed signal over the aircraft bus.

19. The system of claim 8 wherein the altering apparatus includes forming shaped extensions from the periphery of the wire loop at predetermined intervals about the periphery, said shaped wire loop extensions causing a rate of amplitude modulations of the electric field commensurate with the wheel speed.

20. The system of claim 19 wherein the wire loop is shaped in the form of a multi-pointed star with said star apexes at the predetermined intervals about the periphery.

21. The system of claim 19 including a support layer mounted to the rotating wheel; wherein the wire loop is disposed at the support layer.

22. The system of claim 8 including a support layer mounted to the rotating wheel; wherein the wire loop is disposed at the support layer; and wherein the altering apparatus includes a plurality of elements of ferro-magnetic material disposed on a first side of the layer about the perimeter of the wire loop at predetermined intervals, said elements acting to distort the magnetic field at the predetermined intervals during wheel rotation.

* * * * *